UNITED STATES PATENT OFFICE 2,495,224

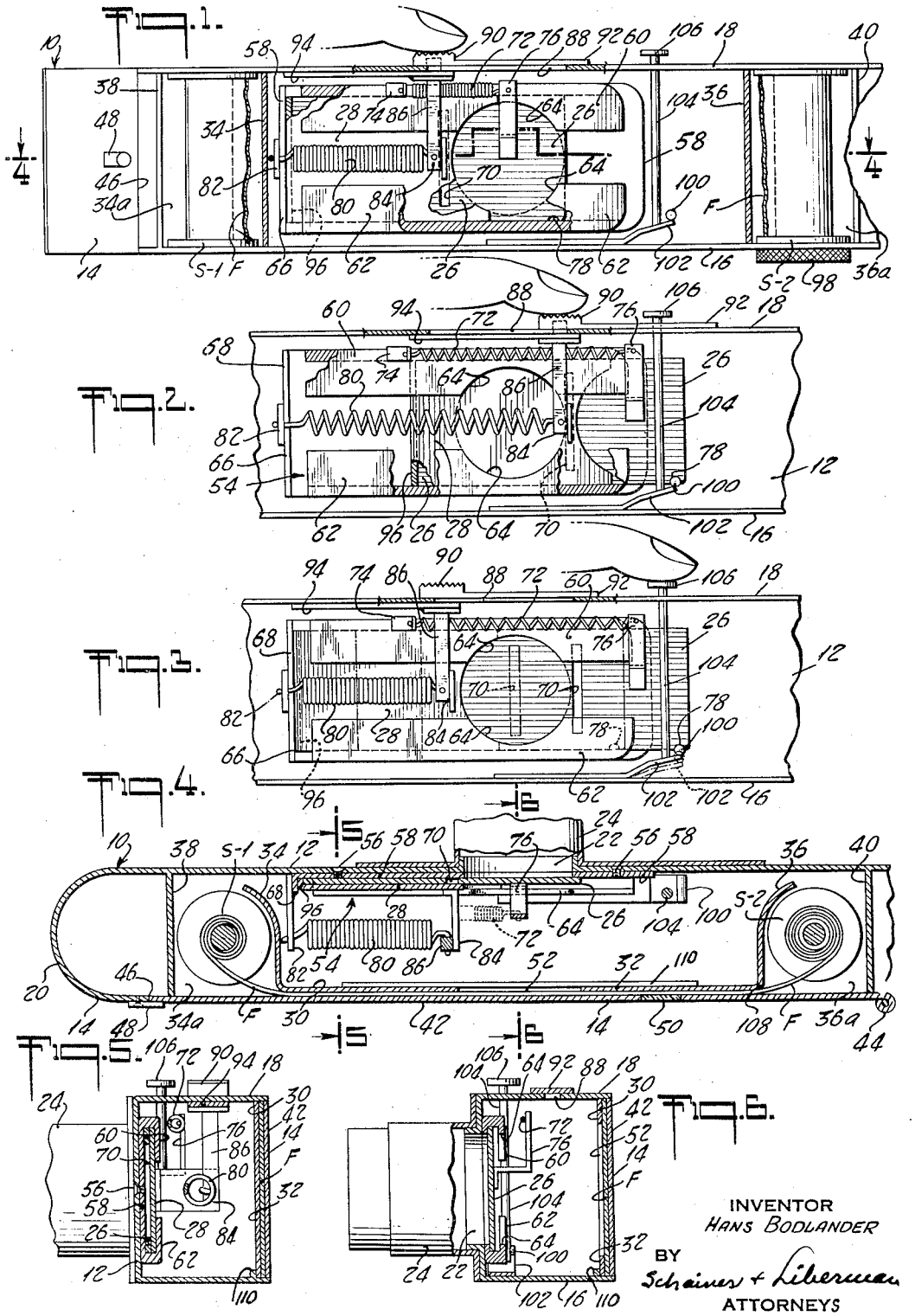

CAMERA AND SLIDING PLATE SHUTTER THEREFOR

Hans Bodlander, Forest Hills, N. Y.

Application March 31, 1948, Serial No. 18,268

1 Claim. (Cl. 95—55)

The main general object of my invention is the provision of a still camera utilizing narrow film strips of the order of 16 mm. or the like. Cameras of this type have been known in the past, but have usually been rather complex and cumbersome mechanisms. Previous still cameras using 16 mm. film or the like have either been bulky and awkward to handle, or have gone to the other extreme and are too small and delicate.

Specifically, then, the main object of the present invention is the provision of a still camera using film of the order of 16 mm. which is relatively long and narrow, resembling in overall outline a conventional fountain pen, having substantially smooth contours and having therein a focal plane shutter, that is a shutter behind the lens rather than between the lens elements. An associated main object of the present invention is the provision of a camera having therewithin a shutter behind the lens, comprising a pair of flatly aligned plates, one of which is provided with a slit, and is movable back and forth across the opening behind the lens, the other of which tensions the first plate for its return movement, and covers same during its movement into tensioned position.

Another object of the present invention is the provision of a shutter mechanism for a camera of the character described, which has an opening in the camera body and a lens in front thereof, a movable plate behind the apertured body, an aperture in the plate, means to move the apertured plate to loaded position past the camera opening, means to cover the aperture during the loading movement, means to uncover the aperture, and means to release the apertured plate for movement across the camera opening to expose the film.

Other, further and more specific objects, as the tensioning means, the baffling means and the like, will in part be specifically pointed out hereinafter, and in part obvious from the following description of an illustrative embodiment.

In the drawings annexed hereto and forming a part hereof,

Figure 1 is a rear elevational view of a portion of the camera interior, with the film support plate and with the rear cover removed, partly in elevation and partly in section;

Fig. 2 is a similar view of a portion of the mechanism shown in Fig. 1, illustrating the movement of the parts to "loaded" or tensioned position;

Fig. 3 is a view similar to Fig. 2, showing the return movement of the loading plate;

Fig. 4 is a horizontal section on the line 4—4 of Fig. 1;

Fig. 5 is a vertical transverse section on the line 5—5 of Fig. 4; and

Fig. 6 is a vertical transverse section on the line 6—6 of Fig. 4.

Reference numeral 10 indicates the camera of my invention generally, which consists of an elongated casing having a front wall 12, a rear wall 14, floor 16, and top 18. Both ends of the casing may be curved, as indicated at 20. An opening 22 is provided in front wall 12, in line with which a suitable lens 24 may be mounted. The shutter component of my invention is mounted inside the casing immediately behind opening 22, the shutter consisting generally of a pair of flat plates 26, 28.

A film guide 30 is provided consisting of a flat, vertically arranged plate 32 having a forwardly extending and outwardly curved flange 34, 36 at each end thereof, defining film spool receiving compartments 34a, 36a between flanges 34, 36 and end wall portions 38, 40 extending vertically across the container 10 adjacent the ends thereof. As will be seen from Figs. 4, 5 and 6, plate 32 is so spaced from rear wall 14 as to permit the passage of the film strip F therebetween, the film being drawn from one spool S—1 across plate 32 onto spool S—2. A door 42, hinged at 44 and extending across the back of casing 10 from one end of the casing to the other end, at 46, permits access to the film compartments 34a, 36a. A suitable catch 48 releasably locks door 42 to the casing. A red transparent window 50 is provided in door 42 to permit inspection of the film or film paper backing during the unreeling thereof, for proper positioning of the film frames.

An aperture 52 is provided in film guide plate 32, of rectangular shape, and of such size as to define the picture area, the aperture 52 permitting light rays passing through lens 24 and through the shutter opening to impinge upon and activate the portion of the film positioned opposite aperture 52, which is aligned with the lens 24.

The shutter structure of my invention, generally indicated by reference numeral 54, may be formed as a unitary structure for insertion inside casing 10, and may be secured therewithin by screws 56, 56 extending through the front wall 12 into shutter base plate 58. This base plate 58 is formed of such width that the upper and lower wing edges thereof may be bent inwardly and then downwardly and upwardly respectively, as indicated at 60, 62 to form a channel between the front of plate 58 and the wings 26, 28 within which the shutter plates are positioned for reciprocating movement. As seen in Figs. 1, 2 and 3, circular portions of wings 60, 62 are cut away in line with the lens 24 and film path opening 52, so as to permit free unobstructed passage of the light rays through the lens and opening 52 onto the film, as at 64, 64. At one side 66 thereof, the edge of base 58 is bent inwardly as at 68 to form a stop to limit movement of plates 26, 28 in that direction.

Plate 26 is of flat metallic material, and is wider than the camera opening 22 behind lens 24, and of such length as to extend from stop 68 towards, across and past the opening 22. A vertically extending slit 70, equal to the diameter of the camera opening 22 is provided in plate 26, located on the left side of the plate when in the "at rest" position of Figs. 1 and 4. A normally contracting coil spring 72 serves to keep plate 26 in this "at rest" position, one end of spring 72 being secured to upper wing 60 at 74, and the other end thereof being anchored to the right end of the plate, at 76. The lower right edge of plate 26 is notched, at 78, for reasons to be developed below.

During loading or tensioning of the apertured plate 26 in its movement across the lens opening 22, 24, slit 70 must be covered in order to avoid film exposure. For this purpose, I have provided a second flat, thin metallic plate 28, fitting into the channel formed by plate 58 and wings 60, 62 directly behind plate 26. This loading plate 28 is the same width as plate 26, but is shorter, extending from stop 68 to the left side of opening 22. It, too, is normally tensioned by a contracting spring 80 and held thereby in the "at rest" position of Figs. 1, 2 and 4, one end of spring 80 being anchored to stop 68, at 82, the other end of the spring being secured to the right side of plate 28, at 84. A vertically extending shaft 86 is secured to plate 28 adjacent connection 84, extending upwardly and through a lengthwise slit 88 in the top wall 18 of the camera body, and having a knurled button 90 above. A light baffle strip 92 is secured to button 90, shaft 86, lying flatly atop the camera body and of such length as to normally cover slit 88. A second, elongated baffle strip 94 is secured to shaft 86 underneath top wall 18, extending in the opposite direction from strip 92, and of longer length than slit 88. The left vertical edge of plate 28 is bent forwardly, as indicated at 96, forming a seat against which plate 26 rests under the influence of spring 72.

The operation of my camera is as follows: The camera is opened from the rear, as by releasing catch 48, thereby permitting door 42 to be swung outwardly on hinge 44 away from the camera body, exposing chambers 34a, 36a. A spool of film S—1 is disposed in chamber 34a and the film drawn out, threaded over plate 32 and the leading end thereof engaged on spool S—2 in chamber 36a. Door 42 may then be closed and will serve as a film pressure plate. A winding knob 98 on the underside of the camera body, provided with the usual key (not shown) engages spool S—2 until the proper film position is achieved, as may be seen through window 50.

Normally, the shutter and its operating parts will then be in position of Fig. 1, wherein baffle 92 completely covers slit 88. Button 90 is then manually shifted to the right along slit 88, which movement, through shaft 86, shifts plate 28 in the same direction. At the same time, through the engagement by finger 96, this movement of plate 28 carries plate 26 along with it. During this shifting movement of the two plates 26, 28 against the normal tensioning respectively of springs 72, 80, the vertical slit 70 will be covered by plate 28, and light prevented from reaching the film behind opening 52. Further, as baffle 92 moves past slit 88, baffle 94 keeps the slit closed against the passage of any light therethrough. Button 90, during its shifting movement to the end of slit 88, brings the right end of plate 28 past and completely covers camera opening 22, and at the same time slidably shifts plate 26 along with it to a point at which slit 70 is located past opening 22, where notch 78 in plate 26 is engaged by a detent 100 which is urged into the notch by spring 102, and plate 26 held thereby in such "loaded" or spring-72-tensioned position, as in Fig. 2. Plate 26 thus being locked, button 90 may be released and the plate 28 permitted to slide back under the influence of spring 80 to the normal, "at rest" position of Figs. 1 and 3. The camera may then be directed at the subject and focussed, and when detent 102 is released from notch 78, as by a vertically positioned rod 104 secured to spring 102 and extending through and upwardly of top 18, terminating in a button head 106, slide 26 moves rapidly under the influence of spring 72 back to its "at rest" position, the movement of slit 70 across aperture 22 exposing the film behind aperture 52. The speed of the shutter movement is determined, of course, by the strength of spring 72, and this may be varied, as will be readily understood, to increase or decrease the speed of movement of plate 26. After each exposure, the knob 98 is rotated to move the film and bring an unexposed frame in line with opening 52, as can be determined by inspection through window 50. At no time during the entire operation, other than during the deliberately permitted return movement of plate 26, is the film exposed to light. Baffles 92, 94 keep slit 88 protected, and plate 28 covers slit 70 at all times during the shutter tensioning operation.

Other and further modifications of my invention may be made within the scope of the appended claims. For instance, plate 28 may be engaged with plate 26 for the loading by means other than finger 66. Plate 26 may be locked in "loaded" position by a detent at other positions on the camera. The scope of my invention is to be limited only by the claims appearing at the end hereof.

Film guide 30 may be loosely or permanently fixed in the position shown, located by rib 110, or it may be so mounted within camera body as to permit it to be swung away to provide access to the interior and the shutter mechanism. Referring to Fig. 4, one end of plate 32 may be provided with a pin, as 108, extending lengthwise through the plate, or a pair of pins extending from the sides thereof, pins 108 fitting into suitable sockets in top 18 and bottom 16. Thus, when desired, on removal of spool S—1 from chamber 34a, plate 30 may be swung on the pivot of pins 108 outwardly, thereby to expose to view the interior of the camera body and the shutter mechanism. Other changes in design, appearance and operation may all be made without departing from the spirit of my invention.

Having now described my invention, what I claim and desire to secure by Letters Patent is:

In a camera; a casing, a lens on the casing, a shutter therewithin comprising a fixed base plate having a film activating light admitting aperture therethrough; a second plate, reciprocably shiftable with respect to the base plate, and disposed behind the base; a light admitting opening in the second plate normally out of registry with the base aperture on one side thereof; first means normally biased to restrain the second plate with respect to the base plate with the opening in the base plate covered by an imperforate portion of the second plate; a third plate, imperforate, reciprocably shiftable with respect to the first and second plates, disposed behind the second plate; said third plate being of such extent as to normally overlie the opening in the second plate on one side of the light aperture in the base plate; second means normally biased to restrain the third plate in said position; an engagement between the third and second plates; means operable from outside the casing to shift the third plate; shifting movement of said third plate against its normal biasing shifting the second plate against its normal biasing with its opening past the light aperture, said opening being covered by the third plate during said shifting movement; means to restrain the second plate in the shifted position with its opening out of registry with the light aperture, on the other side of the aperture; the third plate under the influence of its normal biasing returning to its normal position out of registry with the aperture and in such returned position uncovering the opening in the second plate; means operable from outside the casing to release the retaining means; operation of said release means releasing the tensioned second plate, in response to its normal biasing, to shift back to its original position, the opening in the second plate crossing the aperture in the base plate to permit the passage of film activating light through the registering opening and aperture the casing having a lengthwise extending slit in the top thereof; the means to shift the third plate comprising a rod secured to the third plate and extending upwardly out of the casing through the slit in the top thereof; and means to baffle the slit and prevent light leakage therethrough, which means comprise in part a flat plate secured to the rod overlying the slit on one side of the rod, and in part a flat plate secured to the rod underlying the slit on the other side of the rod.

HANS BODLANDER.

REFERENCES CITED

The following references are of record in the file of this patent:

UNITED STATES PATENTS

| Number | Name | Date |
|---|---|---|
| 491,921 | Blair et al | Feb. 14, 1893 |
| 1,275,230 | Dolby | Aug. 13, 1918 |
| 1,909,597 | Thompson | May 16, 1933 |
| 2,320,441 | Lessler | June 1, 1943 |
| 2,367,195 | Bolsey | Jan. 16, 1945 |
| 2,418,644 | Hutchison | Apr. 8, 1947 |